March 30, 1943.   W. H. BASELT   2,315,241
BRAKE
Filed Jan. 29, 1940   4 Sheets-Sheet 3
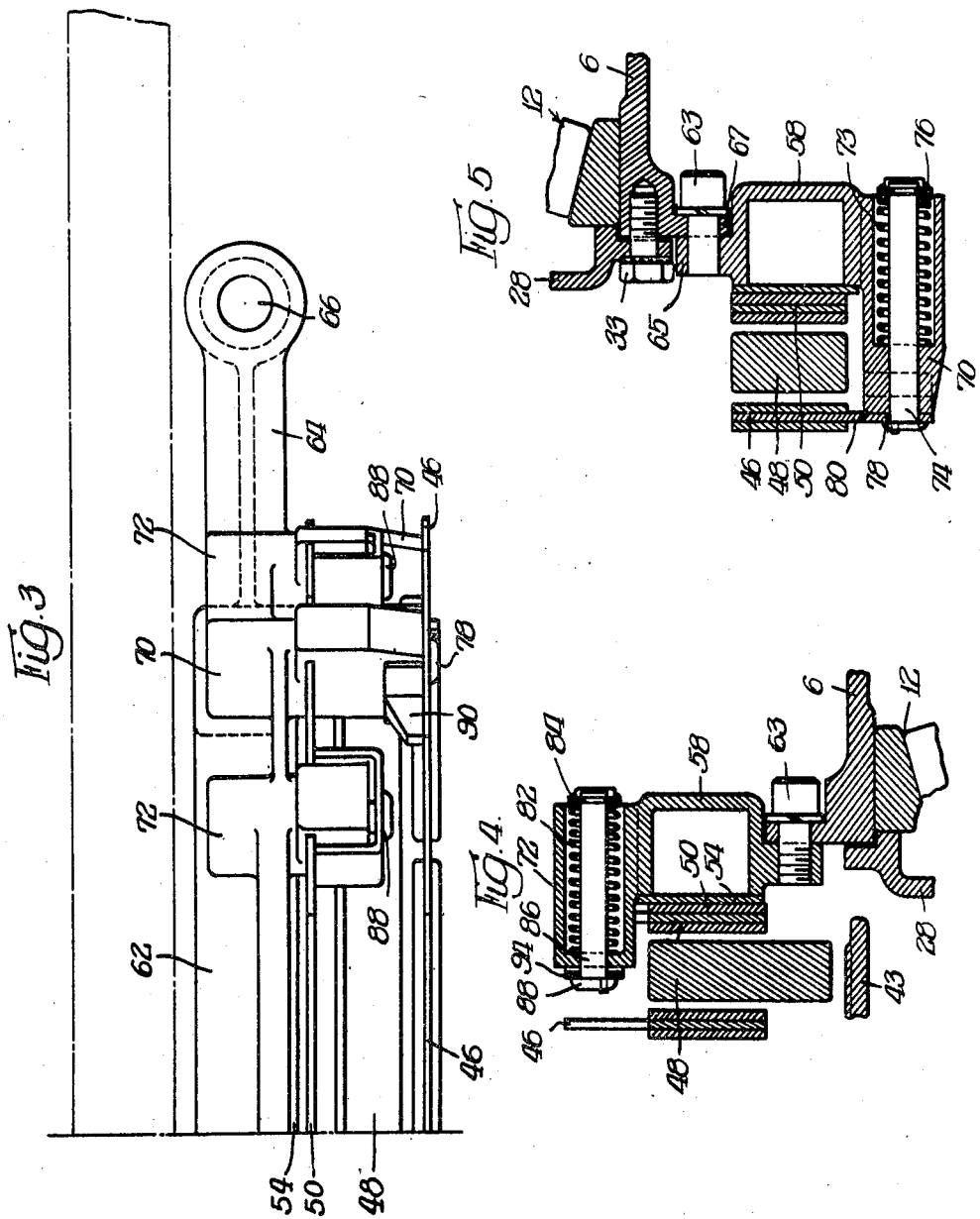
INVENTOR.
Walter H. Baselt,
BY
ATTORNEY.

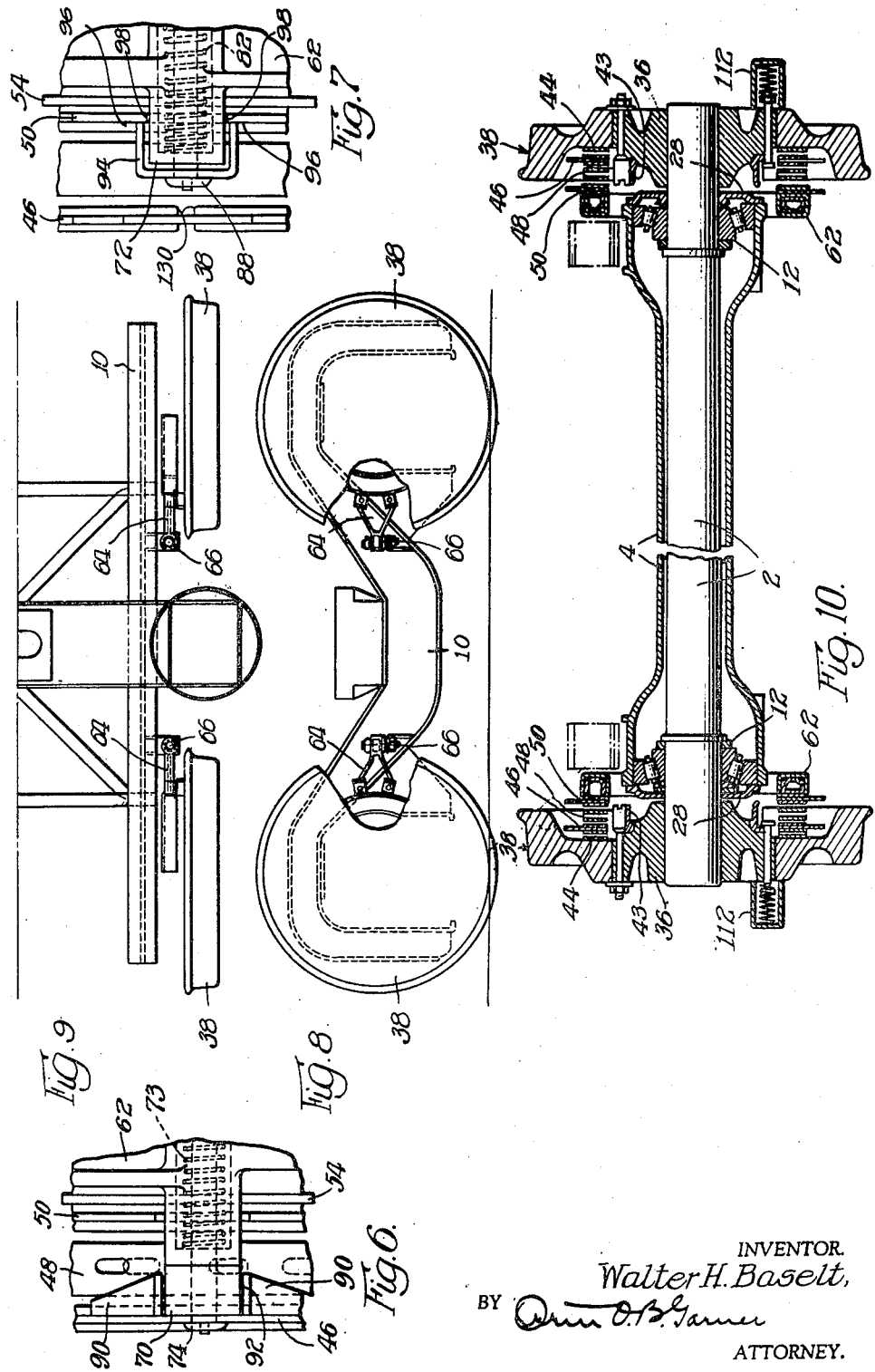

Patented Mar. 30, 1943

2,315,241

UNITED STATES PATENT OFFICE 2,315,241

BRAKE

Walter H. Baselt, Chicago, Ill., assignor to American Steel Foundries, Chicago, Ill., a corporation of New Jersey Application January 29, 1940, Serial No. 316,079

20 Claims. (Cl. 188—153)

My invention relates to brake rigging for a railway vehicle and more particularly to a novel form of such brake utilizing interleaved rotors and stators for development of braking forces of a design commonly called rotor brake.

My invention comprehends an arrangement of a disk type brake carried on an antifriction wheel and axle assembly comprising an inner axle and an outer axle wherein the power means for the brakes is supported from one axle, and certain of the braking elements are supported from the other axle in such manner that when the brakes are applied the antifriction bearings are not subjected to the brake forces and one of the said axles is placed under simple tension and the other under simple compression with neither of said axles being subjected to torsion.

An object of my invention is to design such an arrangement which will be suitable for application inboard the wheels of a roller bearing structure having inboard bearings for support of the truck frame.

Another object of my invention is such an arrangement as that above described wherein the truck is supported on an outer axle, bearings are supported between the outer axle and inner axle, and wheels are supported on said inner axle and wherein, further, the rotor portions of the brake are mounted on the inboard sides of the wheel to rotate therewith.

A different object of my invention is to provide a rotor brake for an inboard unit wherein the torque means will be transmitted from the braking elements to the frame through a torque arm connected to the brake cylinder, in the modification shown, the brake cylinder being of ring type supported between the wheels and the frame of the truck.

My invention contemplates an arrangement such as that described wherein the drive or rotor elements of the brake are carried by means of a driving ring and drive pins associated with the wheel.

My invention contemplates such a rotor brake for an inboard truck which will meet the manufacturing and operating requirements of the present high-speed trains with a maximum facility.

Figure 3 is a fragmentary top plan view showing a portion of the truck structure and the plan of the torque arm associated with my novel braking arrangement.

Figure 4 is a sectional view through the braking structure taken substantially in the transverse radial planes indicated by the line 4—4 of Figure 2, and Figure 5 is a sectional view through the braking arrangement taken substantially in the radial planes indicated by the line 5—5 of Figure 2.

Figure 2:
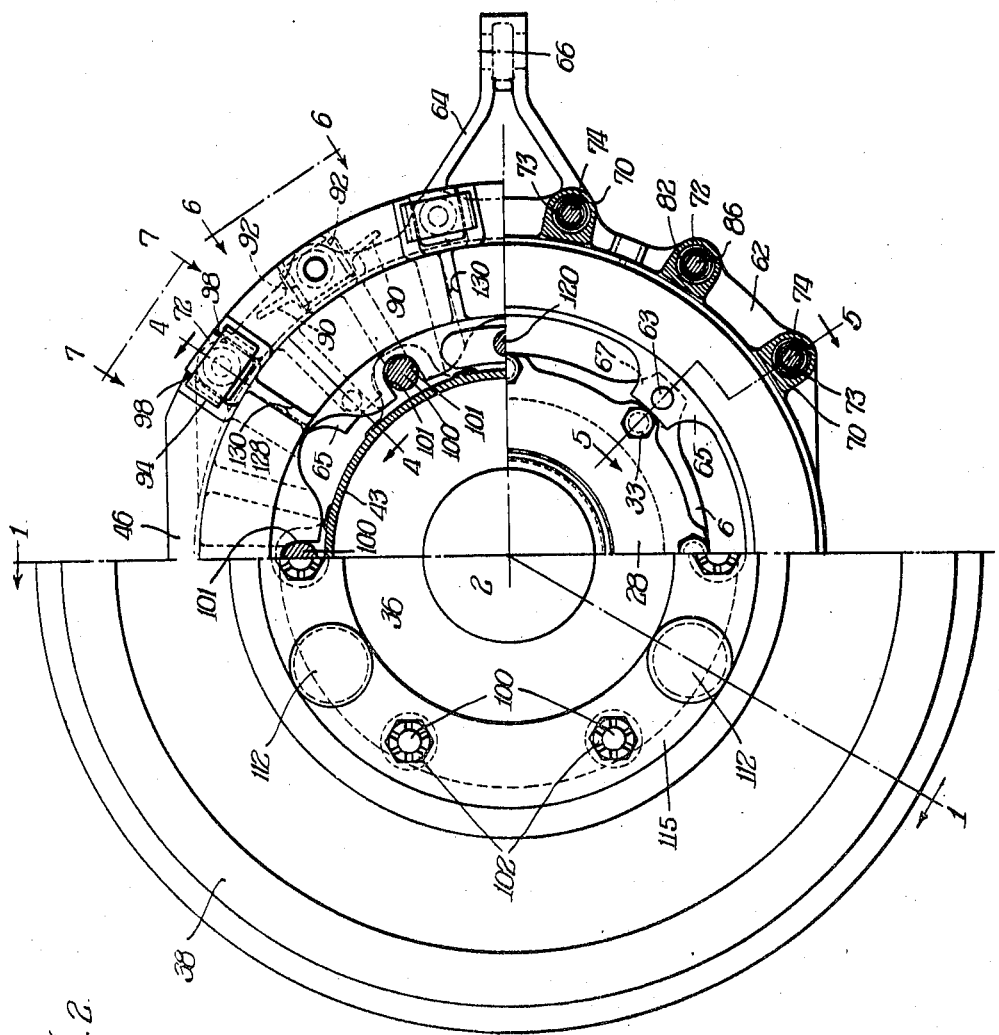
Figure 2 is an end elevation of the wheel and axle assembly, partly in section, the quarter section at the upper right of the figure being taken substantially in the longitudinal plane indicated by the line 2—2 of Figure 1, and a quarter section at the lower right of the figure being taken substantially in the vertical longitudinal plane indicated by the line A—A of Figure 1.

Figures 6 and 7 are views taken from the circumference of the brake assembly and substantially from the viewpoints indicated by the lines 6—6 and 7—7 respectively of Figure 2.

Figure 8 is a fragmentary side elevation of a truck structure embodying my novel brake arrangement with portions of the wheels cut away to show the torque arm connection with the side frame.

Figure 9 is a fragmentary top plan view of the truck structure shown in Figure 8.

Figure 1:
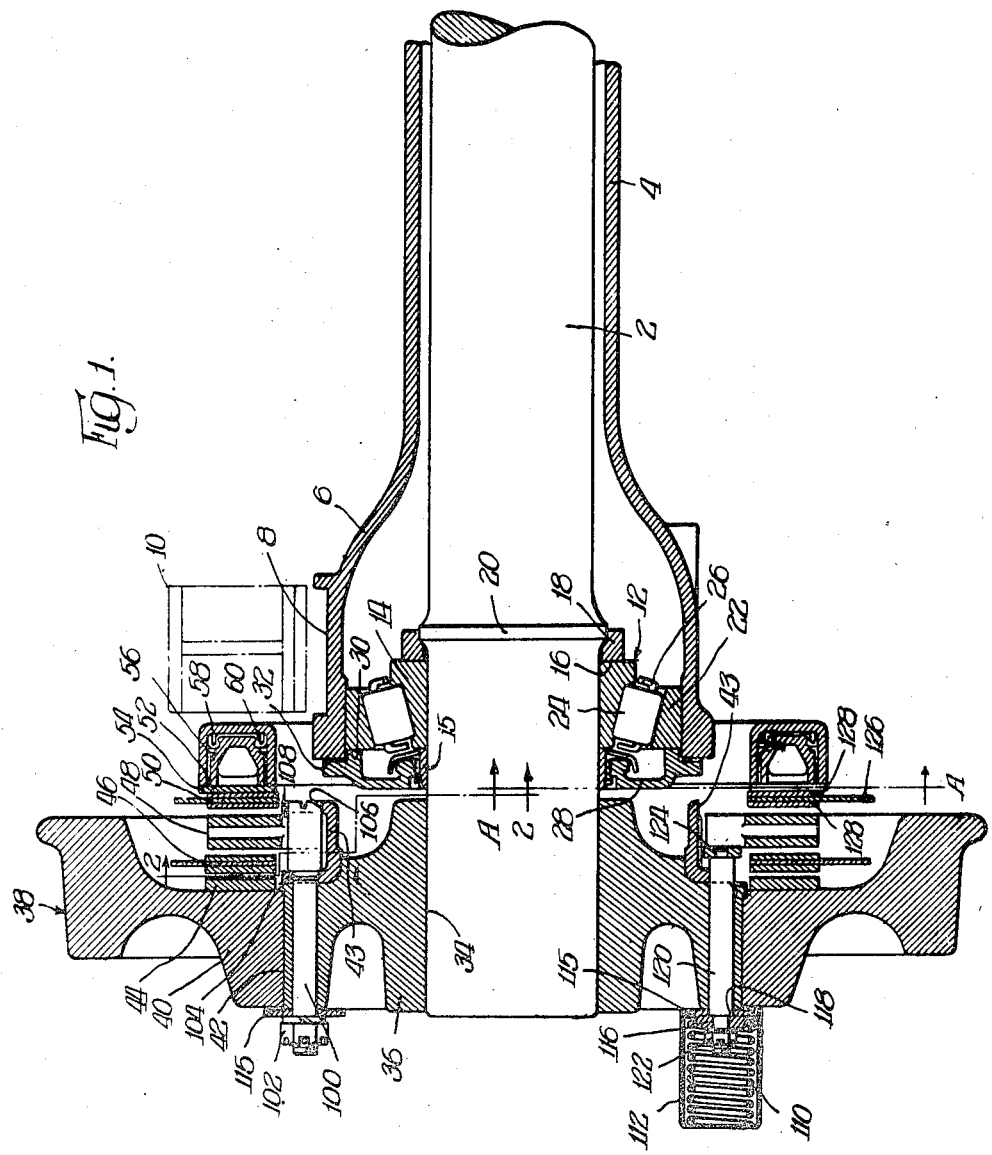
Figure 1 is a sectional view through a wheel and axle assembly embodying my invention, and showing also a fragmentary portion of the supported truck structure, the section being taken substantially in the planes indicated by line 1—1 of Figure 2.

Figure 10 is a sectional view comparable to Figure 1 but showing a complete wheel and axle assembly.

Describing my novel structure in greater detail, the wheel and axle assembly comprises the inner axle 2 and the outer axle or axle housing 4, the ends of said outer axle being enlarged to a bell-like structure indicated at 6 at the top of which may be formed a seat indicated at 8 for a bearer (not shown) affording support for a longitudinal member of the truck frame indicated at 10 through the medium of any convenient journal arrangement, such as pedestal jaws. Within the bell-like end 6 of the outer axle may be mounted the bearing generally indicated at 12 comprising a cone 14 press-fitted upon the inner axle in abutment as at 16 with the collar 18 having bearing against the shoulder 20 on the axle 2, said cone being maintained in position thereagainst by the cone spacer 15. Within the bell-like end of the outer axle may be press-fitted the cup or outer race 22 of the bearing, and between said cup and cone are the usual series of rollers 24, 24 properly spaced as by means of the cage 26. The bearing cavity within the bell-like end 6 may be enclosed by the closure plate 28, said plate having at its inboard edge annular abutment as at 30 with the cup 22 thereby affording positioning means for said cup, and adjustment for the bearing may be had by means of adjusting shims indicated at 32 between the closure plate 28 and the end of the outer axle, said closure plate 28 being secured in position on the end of said outer axle by a series of stud bolts 33, 33 (Figure 5).

Upon the projecting end of the inner axle 2 may be press-fitted as at 34 the hub portion 36 of the wheel generally indicated at 38, said wheel comprising also the plate and tread portion 40 press-fitted upon the hub as at 42.

The brake assembly is supported inboard of the wheel with the outboard rotor secured directly thereto and the inboard rotor supported therefrom by means of the drive ring 43. The cylinder and stators are supported from the outer axle as best seen in the sectional views of Figures 4 and 5 and more particularly described hereafter. The brake assembly comprises the rotor member 44 secured on the inboard face of the wheel in any convenient manner as by countersunk machine screws (not shown), the outboard stator 46, the rotor 48 and the inboard stator 50, said inboard stator having bearing as at 52 against the disk insulator 54 which seats against the outboard face of the ring piston 56. The ring piston 56 is seated within the ring cylinder 58, and between said cylinder and piston is the flexible packing member 60.

The form of the cylinder casting generally indicated at 62 may best be understood from a consideration of the plan view of Figure 3 and the sectional views of Figures 2, 4, and 5. The cylinder casting 62 is secured on the end of the outer axle by a series of threaded bolts 63, 63 extending through lugs 65, 65 spaced about the inner perimeter of the casting, said lugs 65, 65 being aligned with lugs 67, 67 similarly formed about the outer perimeter of the bell-like end 6 in the manner best illustrated in Figures 2 and 5. The cylinder casting 62 comprises the ring cylinder 58 already mentioned, and the torque arm 64 which may be secured as at 66 to the side member 10 of the truck frame. Integrally cast in alternate arrangement about the circumference of the cylinder casting 62 are the hollow lugs 70 and 72. Within each lug 70 is housed a release spring 73 connected at its inboard end by means of the retainer washer 76 to the plunger or bolt 74, the opposite or headed end of said bolt affording means as at 78 for seating the outboard stator in its released position against the outboard end of the lug 70 as at 80.

Within each hollow lug 72 is housed the release spring 82 connected at its inboard end as at 84 by means of a retainer washer to the bolt or plunger 86, the opposite or headed end of which affords a means as at 88 for retaining the inboard stator 50 in its released position in abutment against the insulator ring 54. The forms of the connections at 78 and 88 respectively are more easily understood from a consideration of Figures 6 and 7. In Figure 6, it may be noted that the outboard stator 46 is afforded triangular lugs 90, 90 connected thereto by any convenient means as welding, said lugs affording abutments as at 92, 92 against the lug 70 thus retaining said stator against rotation. In the view of Figure 7 it may be noted that the inboard stator 50 is afforded a U-shaped strap 94 as a means of release connection to the plunger 88, said strap being welded thereto as at 96, 96. Torque from the stator 50 is taken through the lug 72 as by abutment on opposite sides thereof at 98, 98 (Figure 7).

As already stated, the inboard rotor 48 is carried by the drive ring 43, and the drive ring 43 is retained on the inboard sides of the wheel hub portion 36 by means of a series of bolts 100, 100 (Figure 1), each of said bolts having a threaded end for a nut connection at the outboard face of the wheel as at 102. The inboard end of each bolt 100 is enlarged and afforded at countersunk seat as at 104 against the ring 43, said enlarged head having its inboard extremity positioned as at 106 in the aligned opening provided in the flange 108 at the inboard edge of the ring 43. The enlarged head of the bolt 100 thus affords a means of transmitting the torque received from the inboard rotor 48 by abutment therewith as at 101, 101 (Figure 2). Release means for the inboard rotor 48 is afforded by a series of release springs 110, 110 (Figure 1) housed within the cups 112, said cups being secured to the large ring 115 in any convenient manner, as by welding, said ring being retained in position against the outer face of the wheel hub by the bolts 100 already described. The release plunger bolt 120 is afforded a shoulder in abutment with the spring seat 116 as at 118 and extends therethrough for threaded connection with the retaining nut 122. The opposite end of the plunger bolt 120 is afforded a seat as at 124 against the rotor 48.

Each of the stators 46 and 50 is a composite structure corresponding generally to that more particularly described in copending application, Serial No. 306,709, filed in the United States Patent Office November 29, 1939, in the name of Carl E. Tack, and comprises a central flexible steel disk 126 (Figure 1) on the opposite faces of which have been cast pads of braking material indicated at 128, 128, preferably hard iron, said pads taking the form best shown in the sectional view at the top right of Figure 2. Radial slots are afforded between the pads 128, 128 as seen at 130, 130, thus facilitating air circulation as a cooling medium.

In operation, it will be clear that the inboard rotor 48, and the outboard stator 50, the inboard rotor 48, and the outboard stator 46 may be brought into a pile against the outboard rotor 44 on the wheel when the power means is actuated to move the ring piston 56 to the left as seen in Figure 1. Release of the power means will permit the parts to return to their normal released positions as seen in Figure 1 by operation of the release springs already described.

To those skilled in the art, it will be clear that with the brake disks and power means so supported, and the torque arms connected as described, the antifriction bearings are not subjected to brake forces and the inner axle will be placed under simple tension when the brakes are applied and the outer axle under compression due to the equal application of the brakes associated with the wheels at the opposite ends of the wheel and axle assembly. The braking action thus will cause no torsional effect in either axle and the tension and compression effects already referred to are negligible.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a frame, a supporting wheel and axle assembly comprising an inner axle, wheels thereon, an outer axle encasing said inner axle between said wheels, bearings between said axls, closure plates for the ends of said outer axle, braking means at each end of said assembly comprising a cylinder casting supported on the end of said outer axle, power means and release means mounted in said cylinder casting, interleaved rotors and stators between said wheel and said casting supported respectively therefrom, said power means being operable to move certain of said stators and rotors into a pile against one of said rotors for frictional engagement, said release means being operable to return said stators to normal released position, and other release means mounted outboard said wheel and operable to return certain of said rotors to normal released position.

2. In a brake arrangement for a railway car truck, a frame, a wheel and axle assembly comprising an inner axle with wheels, an outer axle supporting said frame, bearings between said axles, a cylinder casting mounted on each end of said outer axle, alternately arranged rotating and nonrotating braking members supported between each casting and the adjacent wheel, power means comprising a ring cylinder mounted in each casting around said axles operable to actuate said braking members, and release means secured on the outer perimeter of each casting outwardly of said ring cylinder operable to return said nonrotating members to their normal released position, each of said release means comprising independently mounted elements, a plurality of which is associated with each nonrotating member, the release means associated with each nonrotating member being operable independently of other release means.

3. In a railway car truck, a frame, a supporting wheel and axle assembly comprising an inner axle, wheels thereon, an outer axle, bearings between said axles, power means mounted on opposite ends of said outer axle, interleaved rotors and stators supported between each wheel and the adjacent power means, each of said power means being operable to move said stators and certain of said rotors into a pile against another of said rotors in abutment with the adjacent wheel, release means mounted on said power means and operable to return said stators to their normal released position, and other release means mounted outboard said wheel and operable to return one of said rotors to normal released position.

4. In a railway car truck, a frame, a supporting wheel and axle assembly comprising an inner axle, wheels thereon, an outer axle encasing said inner axle between said wheels, bearings between said axles, closure plates for the ends of said outer axle, braking means at each end of said assembly comprising a cylinder casting supported on the end of said outer axle, power means and release means mounted in said cylinder casting, interleaved rotors and stators of annular form between said wheel and said casting supported respectively therefrom, said power means being concentric with said axles and comprising a ring piston bearing evenly around an annular face of one of said stators and being operable to move certain of said stators and rotors into a pile against one of said rotors for frictional engagement, said release means being operable to return said stators to normal released position, a plurality of release means being associated with each stator and operable independently of release means associated with other stators.

5. In a railway car truck, a frame, a supporting wheel and axle assembly comprising an inner axle, wheels thereon, an outer axle, bearings between said axles, power means mounted on opposite ends of said outer axle, interleaved rotors and stators supported between each wheel and the adjacent power means, each of said power means being operable to move said stators and certain of said rotors into a pile against another of said rotors in abutment with the adjacent wheel, release means mounted on said power means operable to return said stators to their normal released position, and release means mounted outboard said wheel operable to return certain of said rotors to normal released position.

6. In a brake arrangement for a railway car truck, a frame, a supporting wheel and axle assembly comprising an inner axle with wheels, an outer axle encasing said inner axle between said wheels, bearings between said axles, a cylinder casting supported on said outer axle, rotating and nonrotating braking members interleaved between said casting and an adjacent wheel, power means mounted in said casting for actuation of said braking members, release means mounted in said casting for release of the members supported from said casting, and release means supported from said last-mentioned wheel outboard thereof for release of certain of the members carried thereon.

7. In a brake arrangement for a railway car truck, a frame, a wheel and axle assembly comprising an inner axle with wheels, an outer axle supporting said frame, bearings between said axles, a cylinder casting mounted on each end of said outer axle, alternately arranged rotating and nonrotating braking members supported between each casting and the adjacent wheel, power means comprising a ring cylinder mounted in said casting around said axles operable to actuate said braking members, and release means secured on the outer perimeter of said casting outwardly of said ring cylinder operable to return said nonrotating members to their normal released position, the release means associated with respective stators being operable independently of each other.

8. In a brake arrangement for a railway car truck, a frame, a wheel and axle assembly comprising an inner axle with wheels, an outer axle, bearings between said axles, power means mounted on said outer axle adjacent each wheel in the form of a ring cylinder, a drive ring and a rotor mounted on the inboard face of each wheel, a rotor supported from said drive ring, a stator supported between said rotors, another stator supported from said power means in abutment therewith, and a release mechanism on each wheel for said rotors and on said power means for said stators, said release mechanisms for adjacent stators being mounted independently of each other.

9. In a railway car truck, a frame, a supporting wheel and axle assembly comprising an inner axle, wheels thereon, an outer axle encasing said inner axle between said wheels, bearings between said axles, closure plates for the ends of said outer axle, braking means at each end of said assembly comprising a cylinder casting supported on the end of said outer axle, interleaved rotors and stators between said wheel and said casting supported respectively therefrom, power means in said casting operable to move certain of said stators and rotors into a pile against one of said rotors for frictional engagement, and independent release means for respective stators alternately mounted about the periphery of said cylinder casting, the release means associated with each stator being operable independently of other release means.

10. In a railway car truck, a frame, a supporting wheel and axle assembly comprising an inner axle, wheels thereon, an outer axle, bearings between said axles, power means mounted on opposite ends of said outer axle, interleaved rotors and stators supported between each wheel and the adjacent power means, each of said power means being operable to move said stators and certain of said rotors into a pile against another of said rotors in abutment with the adjacent wheel, and release means mounted on said power means operable to return said stators to their normal released position, the release means associated with each stator being operable independently of release means associated with other stators.

11. In a brake arrangement for a railway car truck, a frame, a supporting wheel and axle assembly comprising an inner axle with wheels, an outer axle encasing said inner axle between said wheels, bearings between said axles, a cylinder casting supported on said outer axle, rotating and nonrotating braking members interleaved between said casting and the adjacent wheel, power means mounted in said casting for actuation of said braking members, certain of said braking members being supported from said casting, and other of said braking members being supported from said last-mentioned wheel, and independent release means for respective stators alternately mounted about the periphery of said casting, the release means associated with each stator being operable independently of other release means.

12. In a brake arrangement for a railway car truck, a frame, a wheel and axle assembly comprising an inner axle with wheels, an outer axle, bearings between said axles, power means mounted on said outer axle adjacent each wheel in the form of a ring cylinder, a drive ring and a rotor mounted on the inboard face of each wheel, a rotor supported from said drive ring, a stator supported between said rotors, another stator supported from the power means in abutment therewith, a release mechanism on the wheel for said rotors and on the power means for said stators, and a torque connection between said power means and said frame.

13. In a brake arrangement for a railway car truck, a frame, a wheel and axle assembly comprising an inner axle with wheels, an outer axle supporting said frame, bearings between said axles, a cylinder casting mounted on each end of said outer axle, alternately arranged rotating and nonrotating braking members supported between each casting and the adjacent wheel, power means comprising a ring cylinder mounted in each casting around said axles operable to actuate said braking members, and release means supported outboard said wheels operable to return certain of said rotating members to normal released position.

14. In a brake arrangement for a railway car truck, a frame, a wheel and axle assembly comprising an inner axle with wheels, an outer axle, bearings between said axles, power means mounted on said outer axle adjacent each wheel in the form of a ring cylinder, a drive ring and a rotor mounted on the inboard face of each wheel, a rotor supported from said drive ring, a stator supported between said rotors, another stator supported from said power means in abutment therewith, and a release mechanism on said wheels for said rotors and on said power means for said stators.

15. In a brake arrangement for a railway car truck, a frame, a supporting wheel and axle assembly comprising an inner axle with wheels, an outer axle encasing said inner axle between said wheels, bearings between said axles, a cylinder casting supported on said outer axle, rotating and nonrotating braking members interleaved between said casting and the adjacent wheel, power means mounted in said casting for actuation of said braking members, and release means mounted in said casting for release of the members supported from said casting, the release means associated with each nonrotating member being operable independently of other release means.

16. In a brake arrangement, a wheel and axle assembly comprising an inner axle with a wheel, an outer axle sleeved around said inner axle, a cylinder casting concentric with said axles and secured on the end of said outer axle opposite the adjacent wheel, braking means including annular rotors and stators interleaved between said wheel and said casting, a ring cylinder with a ring piston mounted in said casting, said ring piston having therearound an annular surface bearing against an annular face of one of said stators, and release means for the respective stators alternately mounted about the periphery of said cylinder casting, the release means associated with each stator being operable independently of release means associated with other stators.

17. In a brake arrangement, a wheel and axle assembly comprising an inner axle with a wheel, an outer axle sleeved around said inner axle, a cylinder casting concentric with said axles and secured on the end of said outer axle opposite the adjacent wheel, braking means including annular rotors and stators interleaved between said wheel and said casting, a ring cylinder with a ring piston mounted in said casting, said ring piston having therearound an annular surface bearing against an annular face of one of said stators, and release means alternately mounted around the periphery of said casting for the respective stators.

18. In a brake arrangement, a wheel and axle assembly comprising an inner axle with a wheel, an outer axle sleeved around said inner axle, a cylinder casting concentric with said axles and secured on the end of said outer axle opposite the adjacent wheel, braking means including annular rotors and stators interleaved between said wheel and said casting, a ring cylinder with a ring piston mounted in said casting, said ring piston having therearound an annular surface bearing against an annular face of one of said stators, and release spring housings for respective stators alternately mounted about the periphery of said casting.

19. In a brake arrangement, a wheel and axle assembly comprising an inner axle with a wheel, an outer axle sleeved around said inner axle, a cylinder casting concentric with said axles and secured on the end of said outer axle opposite the adjacent wheel, braking means including annular rotors and stators interleaved between said wheel and said casting, a ring cylinder with a ring piston mounted in said casting, said ring piston having therearound an annular surface bearing against an annular face of one of said stators, and release means for one of said rotors mounted on the outboard face of said wheel.

20. In a brake arrangement, a wheel and axle assembly comprising an inner axle with a wheel, an outer axle sleeved around said inner axle, a cylinder casting concentric with said axles and secured on the end of said outer axle opposite the adjacent wheel, braking means including annular rotors and stators interleaved between said wheel and said casting, a ring cylinder with a ring piston mounted in said casting, said ring piston having therearound an annular surface bearing against an annular face of one of said stators, release means mounted on the outboard face of said wheel for one of said rotors, and release means alternately mounted about the periphery of said casting for the respective stators.

WALTER H. BASELT.